Patented Mar. 6, 1951

2,544,562

UNITED STATES PATENT OFFICE 2,544,562

PROCESS FOR RECOVERING ALDEHYDES AND KETONES

Vesta F. Michael, Tulsa, Okla., assignor to Stanolind Oil and Gas Company, Tulsa, Okla., a corporation of Delaware No Drawing. Application July 18, 1947, Serial No. 762,001

5 Claims. (Cl. 260—586)

This invention relates to the recovery of aldehydes and ketones from solutions thereof. More particularly, it relates to an improved process for separating aldehydes and ketones from aqueous solutions of bisulfite-aldehyde and bisulfite-ketone adducts.

It is well known that alkali-metal bisulfites form addition compounds with aldehydes and with ketones, and this reaction has been used as a means for separating aldehydes and ketones from other organic materials and for isolating the aldehydes or ketones in substantially pure form. In carrying out such a purification procedure, the aldehyde or ketone is first extracted with a bisulfite solution, suitably sodium bisulfite, which ordinarily has a pH between about 3 and 5 when prepared by dissolving sodium bisulfite in water. The aqueous extract is then made strongly acid or strongly alkaline, the bisulfite salt being thereby destroyed, and the aldehyde or ketone is released, ordinarily as a separate liquid phase. Alternatively, the aldehyde and/or ketone may be released from the extract by heating to an elevated temperature, without adjustment of the pH. As a further alternative, the aldehyde and/or ketone may be separated from the extract, without adjustment of the pH, by extraction with a suitable solvent, the adducts being thereby progressively displaced toward the free aldehyde and/or ketone, owing to the equilibria that are known to exist.

I have now discovered that the separation of aldehydes and/or ketones from aqueous solutions of bisulfite adducts is greatly facilitated by carrying out the heat treatment and/or extraction of the aqueous adduct solution at a pH within the range of about 6 to 7; and I have obtained improved results, compared with the results obtained in the prior art, by carrying out the separation within the range of about pH 5 to 8.

My process may embody a preliminary extraction step, wherein aldehydes and/or ketones are removed from other organic liquids by extraction with an aqueous solution of a water-soluble bisulfite. The preliminary extraction is preferably carried out at ordinary temperatures, but may be carried out at temperatures as low as around 0° C. The extraction of ketones may be carried out as high as around 40° C., and the extraction of aldehydes proceeds satisfactorily at temperatures as high as 80° C.

Ketones may be regenerated from the resulting extract by heating to a temperature above about 40° C., and aldehydes may be regenerated by heating to temperatures above about 80° C. The regeneration is preferably carried out by steam distillation at or above the temperatures designated above. The separation of aldehydes and/or ketones may also be carried out by extraction with a suitable solvent, such as a light hydrocarbon fraction, an alkyl ether, or an ester, at ordinary or elevated temperatures.

In addition to a striking improvement in the efficiency of regenerating aldehydes and ketones, my process has other notable advantages: In the pH range that I prefer to use, the problem of apparatus corrosion is virtually eliminated. Moreover, the losses of active material from the system are small. Sulfur dioxide is not liberated during heat treatment or distillation; there is substantially no loss in bisulfite concentration of the extracting solution through reduction by ferric ions or through other mechanisms; and there is substantially no tendency to precipitate bisulfite adducts in the cold section of the apparatus after repeated cycles. My process is therefore ideally adapted to operation on a continuous or semicontinuous basis, with recycling of regenerated bisulfite solution.

Water-soluble bisulfites in general are suitable for carrying out my process, including bisulfites of alkali metals, specifically lithium, sodium, potassium, rubidium, and cesium; alkaline-earth metals, such as calcium, barium, and strontium; and ammonium and substituted ammonium, such as methylammonium, diethylammonium, tris-(2 - hydroxyethyl) ammonium, benzyltrimethylammonium, and the like. I prefer, however, to use sodium and/or potassium bisulfites, owing to their cheapness and availability. Solutions having a concentration between about 1 and 10% by weight, calculated as the anhydrous bisulfite salt, are most satisfactory. For most effective extraction of aldehydes or ketones from any given solution, the solution should be contacted with substantially more than the equimolar ratio of bisulfite, based on the number of carbonyl groups present, and the extraction is preferably carried out in countercurrent flow.

My process is suitable for recovering or isolating aldehydes and ketones from solution in virtually any organic liquid which is not miscible with aqueous bisulfite solutions and which does not react with or destroy the bisulfite. As examples of such organic liquids may be cited alcohols such as n-butyl alcohol, capryl alcohol, benzyl alcohol, cyclohexanol, and furfuryl alcohol; aliphatic hydrocarbons, such as hexanes, heptanes, octanes, petroleum naphthas, and the like; alicyclic hydrocarbons, such as cyclohexane, methylcyclohexane, and the like; aromatic hydrocarbons, such as benzene, toluene, xylene, and the like; and ethers, such as ethyl ether, isopropyl ether, butyl ether, ethyl butyl ether, and the like.

From such liquids, my process may be used to separate aldehydes, such as acetaldehyde, propionaldehyde, butyraldehyde, isobutyraldehyde, valeraldehyde, octanal, benzaldehyde, furfural, and the like; and ketones, such as acetone, ethyl methyl ketone, methyl n-propyl ketone, methyl n-butyl ketone, cyclopentanone, cyclohexanone, and the like.

My invention is particularly suited for the separation of ketones from hydrocarbon solutions thereof produced in the hydrogenation of carbon monoxide by the Fischer-Tropsch process, and by the numerous modifications thereof; for the recovery of aldehydes and ketones from the alcohols produced by the so-called "Synol" process; for the recovery of aldehydes and ketones from solution in organic liquids resulting from the oxidation of hydrocarbons; and for the recovery of aldehydes from the hydrocarbon solutions thereof resulting from the contacting of olefins with carbon monoxide and hydrogen in the so-called "Oxo" process.

The following examples will more clearly illustrate my invention and demonstrate its superiority over the prior art processes:

Example I

The following example shows that the extraction of carbonyl compounds in my process takes place very rapidly, effective equilibrium being attained in a contact time as short as one-half minute.

An aqueous sodium bisulfite solution was prepared by dissolving 260 grams of sodium metabisulfite ($Na_2S_2O_5$) and 77.4 grams of sodium hydroxide in water and diluting to one liter. The sodium hydroxide reacted with part of the sodium bisulfite to form sodium sulfite, and thereby raised the pH of the solution to 6.6 from an initial value of 4.2. A sufficient quantity of sodium bisulfite was present over the amount required to react with the sodium hydroxide to form a solution containing 6.8 percent by weight of free sodium bisulfite.

A series of extractions were made at 25° C. at contact times between 0.5 and 15 minutes, using in each experiment one liter of bisulfite extractant solution, prepared as described above, to extract one liter of a hydrocarbon solution containing 0.328 gram-mole of mixed aldehydes and ketones, comprising primarily $C_2$–$C_{12}$ compounds. The results were as follows:

| Extraction Time | Carbonyl Compound Removal |
|---|---|
| | Mole per cent |
| 0.5 min | 46.6 |
| 1 min | 45.5 |
| 3 min | 50.0 |
| 5 min | 49.4 |
| 15 min | 47.7 |

Example II

The following example illustrates the extraction of a typical aldehyde from solution in a hydrocarbon and the subsequent regeneration of the aldehyde according to my process.

A 780-ml. portion of sodium bisulfite solution, prepared as described in Example I, was agitated with one liter of heptane containing 5 percent butyraldehyde by volume. Within three minutes, the temperature of the reacting mixture increased from 26 to 34° C., after which the temperature slowly decreased. The aqueous extract was separated from the heptane and steam distilled. The results were as follows:

Butyraldehyde in heptane, vol. percent:
  Before extraction _____ 5
  After extraction _____ 0.002 pH of bisulfite solution:
  Before extraction _____ 6.62
  After extraction _____ 7.93
  After distillation[1] _____ 6.68

Butyraldehyde recovery, percent of original:
  First 100 ml. condensate _____ 36.4
  Second 100 ml. _____ 20.4
  Third 100 ml. _____ 12.0

Total _____ 68.8

[1] Volume adjusted to original by addition of distilled water.

Example III

The effect of pH on the recovery of butyraldehyde from sodium bisulfite solutions by steam distillation was studied by preparing four solutions of aqueous 7.5% sodium bisulfite having a range of pH levels from 4.21 to 6.53. A 780-ml. portion of each solution was then reacted with 25 ml. of butyraldehyde, and the adduct solution was steam distilled. The results were as follows:

| Initial pH of $HSO_3$ solution | 4.21 | 6.02 | 6.33 | 6.53 |
|---|---|---|---|---|
| Volume butyraldehyde recovered, ml.: | | | | |
| First 100 ml. condensate | 1.5 | 0.5 | 2.2 | 4.7 |
| Second 100 ml. condensate | 1.0 | 2.4 | 1.8 | 5.2 |
| Total | 2.5 | 2.9 | 4.0 | 9.9 |

Example IV

The following example demonstrates that the bisulfite extractant solutions of my invention may be effectively regenerated by steam distillation, and when so regenerated, are as effective as fresh bisulfite extractant solution. Both the bisulfite solutions and the hydrocarbon solutions of carbonyl compounds were substantially the same as those employed in Example I.

In the experiment with fresh bisulfite solution, a single one-liter portion of the hydrocarbon solution of carbonyl compounds was extracted repeatedly with fresh one-liter portions of bisulfite solution, and the hydrocarbon solution was analyzed for carbonyl compounds after each extraction.

In the experiment with regenerated bisulfite solution, the regenerated bisulfite solution was first prepared by using a one-liter portion of fresh bisulfite solution for nine extraction and stripping cycles on successive one-liter portions of the hydrocarbon solution of carbonyl compounds. Then a single one-liter portion of the hydrocarbon solution of carbonyl compounds was extracted repeatedly with the regenerated bisulfite solution, the aqueous extract being substantially freed from carbonyl compounds by steam distillation after each extraction, and the hydrocarbon raffinate being analyzed for carbonyl compounds.

The cumulative results are given in the following table:

| Extraction No. | Carbonyl Compounds Extracted, Cumulative | |
|---|---|---|
| | Fresh Extractant, mole per cent | Recycled Extractant, mole per cent |
| 1 | 47.7 | 49.1 |
| 2 | 58.3 | 57.9 |
| 3 | 61.9 | 61.3 |
| 4 | 66.0 | 67.6 |

Example V

The following example demonstrates the feasibility of recycling the bisulfite solutions employed in my invention. A single one-liter portion of pH 6.6 sodium bisulfite solution was used successively to extract ten one-liter portions of a hydrocarbon solution containing carbonyl compounds. Both solutions were identical with those used in Example I. After each extraction, carbonyl compounds were removed from the bisulfite solution by steam distillation at 100° C. The results are given in the following table:

| Extraction No. | Carbonyl Compounds Left in Hydrocarbon | Carbonyl Compounds Extracted |
|---|---|---|
| | G.-mole | Mole per cent |
| 1 | 0.167 | 49.2 |
| 2 | 0.158 | 52.0 |
| 3 | 0.161 | 51.0 |
| 4 | 0.169 | 48.4 |
| 5 | 0.156 | 52.6 |
| 6 | 0.149 | 54.7 |
| 7 | 0.166 | 49.6 |
| 8 | 0.145 | 55.6 |
| 9 | 0.154 | 53.0 |
| 10 | 0.167 | 49.1 |

At the conclusion of the ten extraction and stripping cycles, the residual aldehydes and ketones in a portion of the steam-stripped bisulfite extractant solution were liberated with sodium carbonate, and aldehydes and ketones equal to 1.6 volume percent of the extractant solution were recovered. This very low quantity of recycled carbonyl compounds, after ten cycles, together with the maintenance of extraction efficiency, indicates that the solution could be used for many more cycles before becoming ineffective.

While the foregoing examples illustrate the preferred forms of my invention, it will be understood that departures may be made therefrom within the scope of the specification and claims. In general, it may be said that any modifications or equivalents that would ordinarily occur to those skilled in the art are to be considered as lying within the scope of my invention.

In accordance with the foregoing specification, I claim as my invention:

1. In a process for the recovery of a carbonyl compound selected from the group consisting of aldehydes and ketones from a mixture comprised thereof, the steps which comprise adjusting the pH of an aqueous solution of a water soluble bisulfite to a value between about 5 and 8, said solution consisting essentially of a mixture of sulfite and bisulfite ions, thereafter mixing said aqueous solution with said mixture containing said carbonyl compound to form the corresponding bisulfite adduct of said carbonyl compound, and heating the resulting mixture to a temperature above the decomposition temperature of said adduct without the addition of alkali to said mixture subsequent to the formation of said bisulfite adduct.

2. The process of claim 1 in which the pH of said aqueous bisulfite solution ranges from about 6 to about 7.

3. In a process for the recovery of a carbonyl compound selected from the group consisting of aldehydes and ketones from a mixture comprised thereof, the steps which comprise adjusting the pH of an aqueous solution of a water soluble bisulfite to a value between about 5 and 8, said solution consisting essentially of a mixture of sulfite and bisulfite ions, thereafter mixing said aqueous solution with said mixture containing said carbonyl compound to form the corresponding bisulfite adduct of said carbonyl compound, and steam distilling the resulting mixture to a temperature above the decomposition temperature of said adduct without the addition of alkali to said mixture subsequent to the formation of said bisulfite adduct.

4. In a process for separating and recovering a carbonyl compound selected from the group consisting of aldehydes and ketones from a liquid hydrocarbon solution thereof, the steps which comprise adjusting the pH of an aqueous solution of a water soluble bisulfite to a value between about 5 and 8, said aqueous solution consisting essentially of a mixture of sulfite and b'sulfite ions, thereafter mixing said aqueous solution with the liquid hydrocarbon solution of said carbonyl compound to form the corresponding bisulfite adduct of said carbonyl compound, and heating the resulting mixture to a temperature above the decomposition temperature of said adduct without the addition of alkali to said mixture subsequent to the formation of said bisulfite adduct.

5. In a process for separating and recovering a carbonyl compound selected from the group consisting of aliphatic aldehydes and aliphatic ketones from a liquid hydrocarbon solution thereof, the steps which comprise adjusting the pH of an aqueous solution of a water soluble bisulfite to a value between about 5 and 8, said solution consisting essentially of a mixture of sulfite and bisulfite ions and containing between about 1 and 10 weight per cent of an alkali metal bisulfite, thereafter mixing said aqueous solution with said liquid hydrocarbon solution to form the corresponding bisulfite adduct of said carbonyl compound, stratifying and withdrawing an aqueous extract containing a bisulfite adduct of said carbonyl compound, heating said aqueous extract at a pH between about 5 and 8 and at a temperature above the decomposition temperature of said bisulfite adduct without the addition to alkali to said adduct subsequent to the formation of said bisulfite adduct, withdrawing said carbonyl compound in purified form as a distillate fraction and regenerated aqueous bisulfite solution as a bottoms fraction, and recycling said regenerated aqueous bisulfite solution for the extraction of an additional quantity of said liquid hydrocarbon solution.

VESTA F. MICHAEL.

(References on following page)

REFERENCES CITED

The following references are of record in the file of this patent:

UNITED STATES PATENTS

| Number | Name | Date |
|---|---|---|
| 698,355 | Bazlen | Apr. 22, 1902 |

FOREIGN PATENTS

| Number | Country | Date |
|---|---|---|
| 267,954 | Great Britain | June 9, 1927 |

OTHER REFERENCES

Fieser et al., Organic Chemistry, Heath and Co., (1944) pages 206–209.

Stewart et al., American Chemical Society Journal, vol. 54, (1932) pages 3555–3569.

Stewart et al., Amer. Chem. Soc. Jour., vol. 54, (1932) pages 2333–2340.